(12) United States Patent
Perin et al.

(10) Patent No.: US 9,934,704 B2
(45) Date of Patent: Apr. 3, 2018

(54) APPARATUS AND METHOD FOR VISUAL IDENTIFICATION OF VALVES IN MULTIVALVE DISTRIBUTION AND TRANSMISSION SYSTEMS

(71) Applicants: Michael Perin, Port Perry (CA); Jeremy L Hunt, Whitby (CA)

(72) Inventors: Michael Perin, Port Perry (CA); Jeremy L Hunt, Whitby (CA)

(*) Notice: Subject to any disclaimer, the term of this patent is extended or adjusted under 35 U.S.C. 154(b) by 0 days.

(21) Appl. No.: 15/042,746

(22) Filed: Feb. 12, 2016

(65) Prior Publication Data

US 2016/0240113 A1 Aug. 18, 2016

Related U.S. Application Data

(60) Provisional application No. 62/115,526, filed on Feb. 12, 2015.

(51) Int. Cl.
| | |
|---|---|
| *G06K 19/00* | (2006.01) |
| *G09F 3/00* | (2006.01) |
| *G09F 3/02* | (2006.01) |
| *G06K 19/06* | (2006.01) |
| *G06K 19/077* | (2006.01) |
| *G06K 19/07* | (2006.01) |

(52) U.S. Cl.
CPC ..... *G09F 3/0297* (2013.01); *G06K 19/06037* (2013.01); *G06K 19/0723* (2013.01); *G06K 19/07758* (2013.01); *G09F 3/02* (2013.01); *G09F 2003/0251* (2013.01)

(58) Field of Classification Search
CPC ...... G06Q 50/22; G06Q 10/087; G06Q 50/24; G06Q 10/08; G06Q 30/0621; G06F 19/322; G06F 19/327; G06F 19/323; G06F 19/3412; G06F 1/1684; A61B 5/150786; A61B 5/742; G09F 2003/0216; B65D 2313/04; G06K 17/00
USPC ......... 235/375, 385, 494; 705/2, 3, 26.5, 28; 283/70, 74, 75, 81, 100, 105, 900
See application file for complete search history.

(56) References Cited

U.S. PATENT DOCUMENTS

| | | | | |
|---|---|---|---|---|
| 4,154,011 A | * | 5/1979 | Rakestraw | G09F 3/005 283/75 |
| 2004/0104320 A1 | * | 6/2004 | Exler | A47G 23/0225 248/206.5 |
| 2007/0176069 A1 | * | 8/2007 | Mitchell | A47G 23/0225 248/311.2 |

* cited by examiner

*Primary Examiner* — Jamara Franklin
(74) *Attorney, Agent, or Firm* — Tai W Nahm; Miller Thomson LLP

(57) ABSTRACT

There is disclosed an apparatus and method for visual identification of valves in multi valve distribution and transmission systems, and particularly for municipal utility infrastructures such as mainline, connection, drain, pressure district, pressure regulating and pressure sustaining valves. In an embodiment, the apparatus comprises a flexible, adjustable, color coded band that when assembled the apparatus forms a generally tubular shape; and the apparatus includes one or more securing mechanisms adapted to secure the apparatus to a valve.

18 Claims, 4 Drawing Sheets

APPARATUS AND METHOD FOR VISUAL IDENTIFICATION OF VALVES IN MULTIVALVE DISTRIBUTION AND TRANSMISSION SYSTEMS

FIELD

The present disclosure relates to an apparatus and method for visual identification of valves in multi valve distribution and transmission systems, particularly for municipal utility infrastructures.

BACKGROUND

In the field of distribution and transmission systems—particularly for municipal utility infrastructures such as mainline, connection, drain, pressure district, pressure regulating and pressure sustaining valves—a significant recurring problem is lack of identification or poor identification of the different types and sizes of valves in multi valve systems.

For example, the lack of delineation between transmission, distribution, clockwise and counterclockwise operating valves, water, wastewater, and two tier municipal infrastructures results in increased probability of human error, resulting in increased risk to employees, public safety, infrastructure and the environment. The lack of proper identification also results in increased time to resolution of problems in an emergency, elevating costs of mitigation due to failures.

Existing solutions to identification of valves in multi valve systems are limited in their accuracy (e.g. GIS or GPS based location systems), or may be subject to failure due to inherent design limitations.

What is needed is an improved apparatus and method for visual identification of valves which overcomes at least some of the drawbacks and limitations as described above.

SUMMARY

The present disclosure relates to an apparatus and method for visual identification of valves in multi valve distribution and transmission systems, and particularly for municipal utility infrastructures such as mainline, connection, drain, pressure district, pressure regulating and pressure sustaining valves.

In an embodiment, flexible, adjustable color coded bands are adapted to be secured in place at the opening of multiple valve boxes to easily and accurately identify different types and sizes of valves. Each color or combination of colors represents a different type of valve as established by the municipality. A color coding chart identifying the different types and sizes of valves may be placed at each point of access to the valve boxes to assist in identification of the different types of valves.

Thus, in an aspect, there is provided an apparatus for visual identification of valves in a multi valve distribution or transmission system, wherein: the apparatus comprises a flexible, adjustable band adapted to be secured at an opening to a valve box in a multi valve distribution or transmission system.

In an embodiment, the apparatus is formed of a material having one or more selected colors, whereby, the apparatus secured at the opening to the valve box visually identifies a valve in the multi valve distribution or transmission system by the one or more selected colors.

In another embodiment, the apparatus includes one or more tabs adapted to be slidably received within one or more corresponding slots, whereby the circumference of the apparatus is adjustable in dependence upon the length of the one or more tabs inserted into the one or more corresponding slots.

In another embodiment, the apparatus further includes one or more features indicating a direction. For example, an arrow shaped aperture cut into the apparatus may indicate the direction of valve closure, or alternatively the direction of valve opening, for example.

In another embodiment, the apparatus further includes an aperture for providing access to a valve feature that may otherwise be covered by the apparatus. For example, an oval shaped access aperture may provide access to a valve feature that should remain uncovered.

In another aspect, the apparatus may include one or more features for helping to position and orient the apparatus within a valve. For example, notches or patches having a different color may identify where the notches or patches should be positioned relative to a valve such that one or more apertures may be properly aligned with a valve feature that needs to remain uncovered.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

As noted, the present disclosure relates to an apparatus and method for visual identification of valves in multi valve distribution and transmission systems, particularly for municipal utility infrastructures such as mainline, connection, drain, pressure district, pressure regulating and pressure sustaining valves.

In an embodiment, flexible, adjustable color coded bands are adapted to be secured in place at the opening of multiple valve boxes to easily and accurately identify different types and sizes of valves. Each color or combination of colors represents a different type of valve as established by the municipality. A color coding chart identifying the different types and sizes of valves may be placed at each point of access to the valve boxes to assist in identification of the different types of valves. An illustrative example will now be described with reference to the figures.

Figure 1:
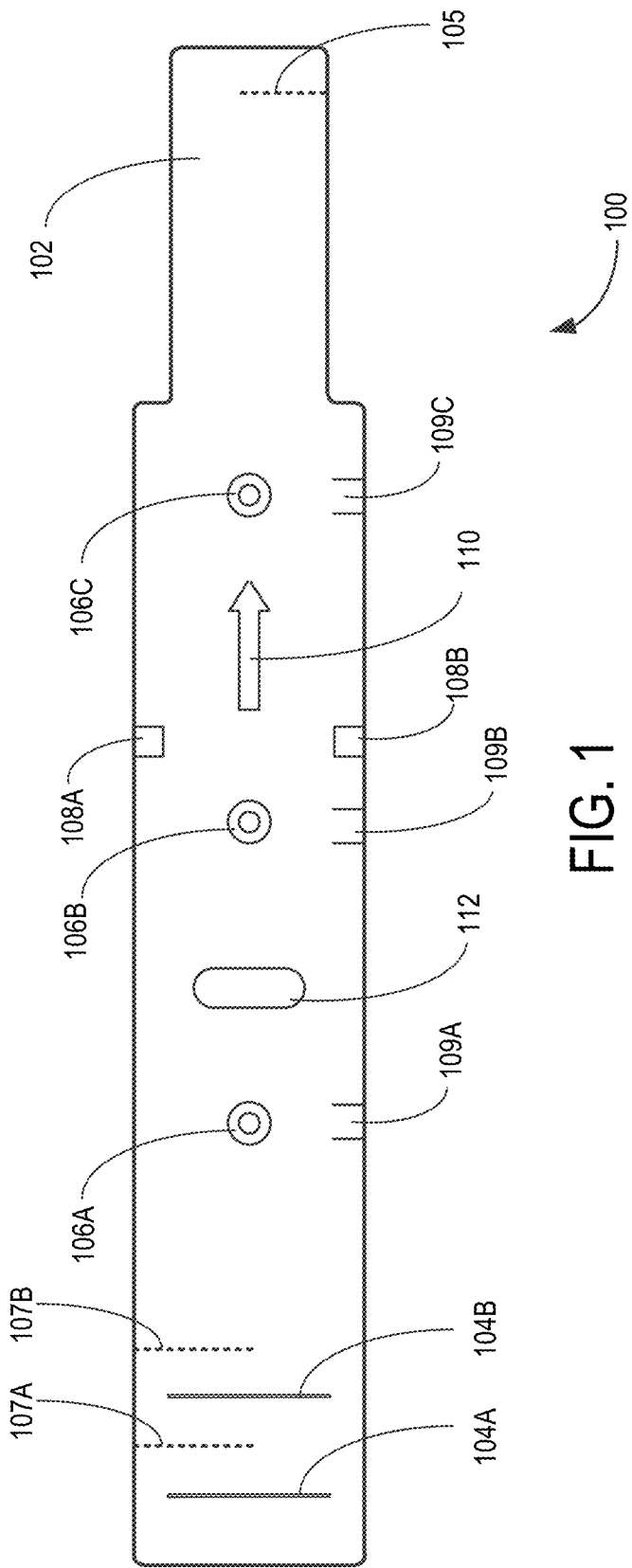
FIG. 1 shows a schematic view of an apparatus in accordance with an embodiment.

Referring to FIG. 1, shown is a schematic view of an apparatus 100 in accordance with an embodiment. In this illustrative example, the apparatus 100 is generally a flexible, adjustable band shown in its flat, unassembled form. As will now be explained, apparatus 100 may be assembled into a generally tubular, adjustable band adapted to be secured at an opening to a valve box in a multi valve distribution or transmission system.

As shown in this illustrative example, apparatus 100 includes a tab 102 adapted to be received in one or more corresponding slots 104A, 104B. This allows the apparatus 100 to be formed into a generally tubular shape when assembled. It will be appreciated, however, that other means of connecting the two opposite ends, such as by means of an adhesive, or opposing cuts 105, 107A, 107B, half-way into the band may also be used.

Apparatus 100 further includes a plurality of securing mechanisms 106A-106C. For example, the securing mechanisms may be magnets placed at intervals along the band such that when the apparatus 100 is assembled into a generally tubular band, the securing mechanisms 106A-106C are distributed around the band. The securing mechanisms 106A-106C may be attached to the band in a number of different ways, including using an adhesive, embedding into the band, or using a mechanical clasping or bolting means to snap or bolt the securing mechanisms in place.

Still referring to FIG. 1, in another embodiment, the apparatus 100 may include one or more notches, flaps or patches 108A, 108B provided at an edge of the band to help align the apparatus 100 for installation in a valve box. The notches, flaps or patches 108A, 108B may help to identify a consistent point of rotation and orientation of the apparatus in a given type of valve box. The notches, flaps or patches 108A, 108B may also help seat the apparatus within a valve box to provide a consistent and level position relative to the opening of the valve box.

In another embodiment, the apparatus 100 may include one or more visual features indicating a direction. For example, as shown in FIG. 1, an arrow shaped aperture 110 cut into the apparatus 100 may indicate the direction of valve closure, or alternatively the direction of valve opening, for example.

In another embodiment, the apparatus 100 may also include an aperture for providing access to a valve feature that may otherwise be covered by the apparatus 100. For example, an oval or "pill" shaped access aperture 112 (or any other suitably shaped aperture) may provide access to a valve feature that should remain uncovered even after the apparatus 100 is installed. As explained above, one or more notches, flaps or patches 108A, 108B may be positioned at edges of the band, which when positioned in a particular location and orientation within a valve box, the oval shaped access aperture 112 may be consistently aligned to provide access to a valve box feature that is to remain uncovered even after the apparatus 100 is installed.

In an embodiment, apparatus 100 is formed of a material having one or more selected colors, whereby, the apparatus secured at the opening to the valve box visually identifies a valve in the multi valve distribution or transmission system by the one or more selected colors.

Thus, color coded valve box inserts are assembled and positioned at the opening of multiple valve boxes to easily and accurately identify the different types of valves accessed via the valve boxes.

Figure 2:
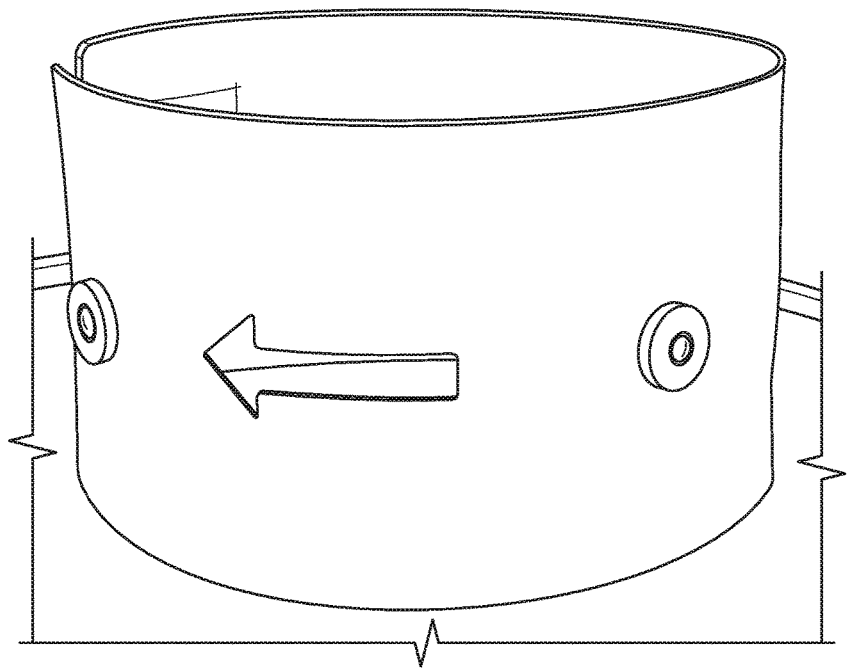
FIG. 2 shows an illustrative example of the apparatus of FIG. 1 is assembled into a generally tubular shaped valve insert in accordance with an embodiment.

Now referring to FIG. 2, shown is an illustrative example of the apparatus 100 of FIG. 1 which is now assembled in accordance with an embodiment. As shown, the apparatus 100 forms a generally tubular shape when the tab 102 is inserted into slots 104A, 104B provided at the opposite end of the band (see FIG. 1, for example). Also shown in FIG. 2 are securing mechanisms (corresponding to securing mechanisms 106A-106C in FIG. 1) which in this example are magnets positioned at intervals around the apparatus 100.

In an embodiment, the apparatus 100 may be manufactured from a material that is sufficiently flexible to allow the band to be bent into the generally tubular shape without difficulty. Because the apparatus 100 may be used in applications in which the valve boxes are subject to both hot and cold temperatures, the chosen material should suitably accommodate extremes in temperature, while still retaining its mechanical integrity—including flexibility, breakage and tear resistance, and fire retardancy.

Figure 3:
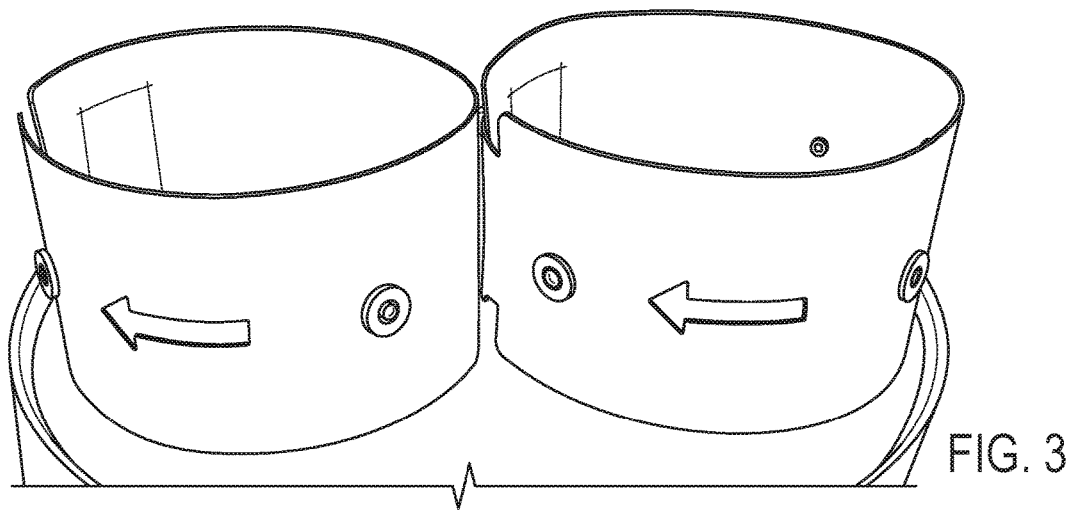
FIG. 3 shows an illustrative example of the apparatus of FIG. 1 assembled into generally tubular shaped valve inserts of different colors in accordance with another embodiment.
Figure 4:
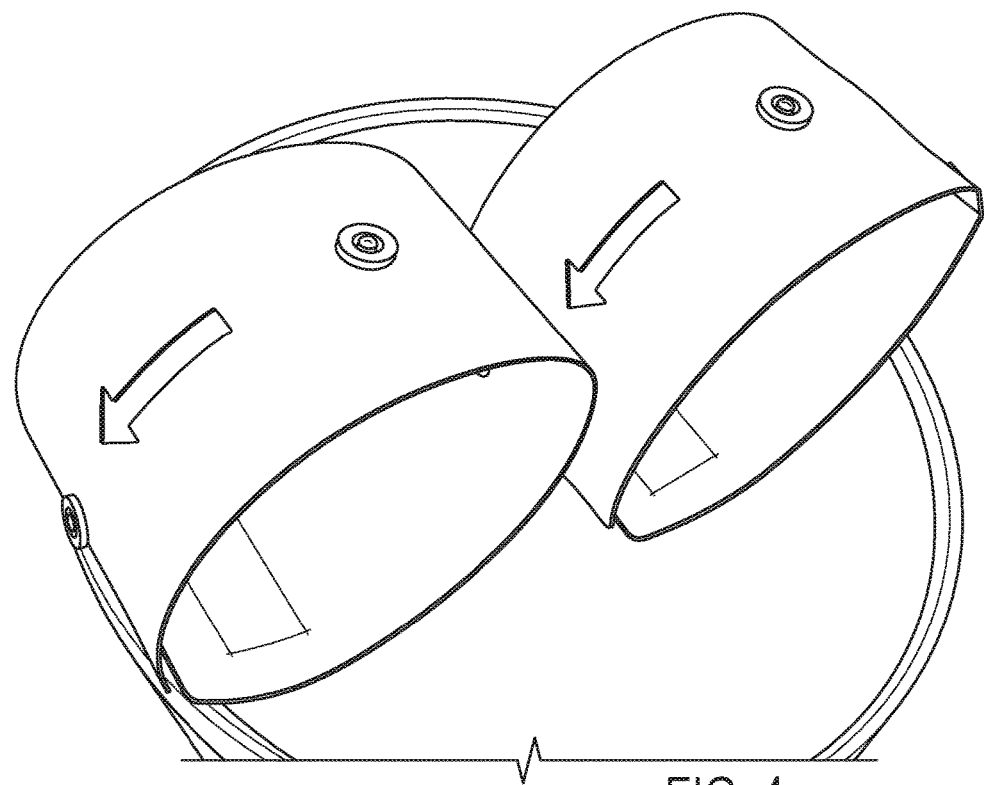
FIG. 4 shows the generally tubular shaped valve inserts of FIG. 3 from a different point of view.

In another embodiment, valve box insert 100 may be manufactured from a material that is available in multiple different colors, as shown in FIGS. 3 and 4, such that the apparatus 100 need not be painted on its surface. As the color would be an inherent characteristic of the material, apparatus 100 would require virtually no maintenance to permanently retain its color once installed.

In addition the material chosen should preferably be chemically resistant to various types of fluids and contaminants that may be carried within the valves. This may include, for example, water, sewage, environmental run-off, and various road contaminants including salt, oil and grease.

In order to provide a sufficiently distinctive number of colors to easily distinguish between different types of valves, it is desirable to select a material available in a wide range of colors, for example plastic materials. If necessary, one or more color bands may be added to the apparatus 100 for example by utilizing paint, or one or more colored tapes applied using an adhesive.

In an embodiment, each municipality may create a color coding system using a color set having an appropriate number of different colors to identify each type of valve. A color coding chart may also be created to allow front line staff to easily identify each type of valve by cross referencing the color coded chart to different types of valves. The color coded chart may thus be used to quickly and accurately identify the different types of valves front line personnel may come across.

Figure 5:
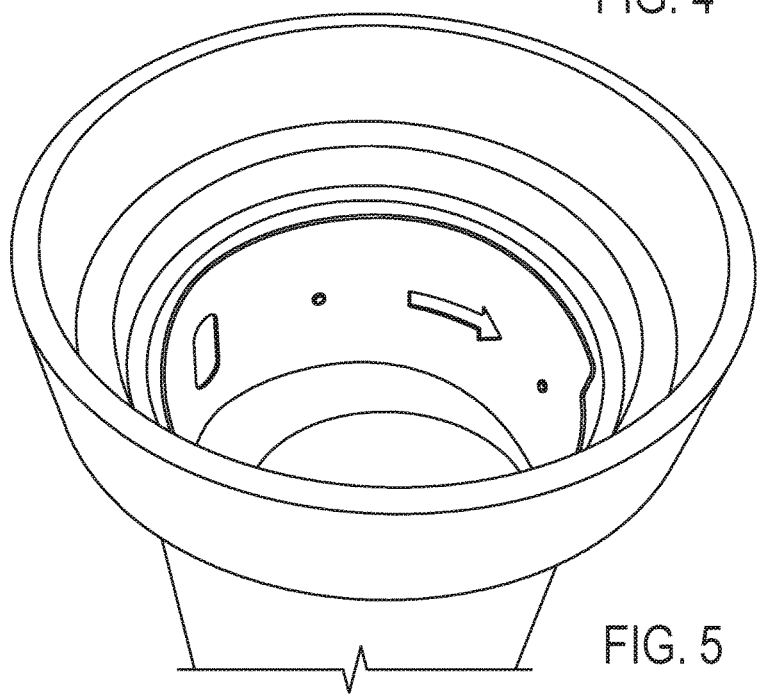
FIG. 5 shows a tubular shaped valve insert positioned within a valve.
Figure 6:
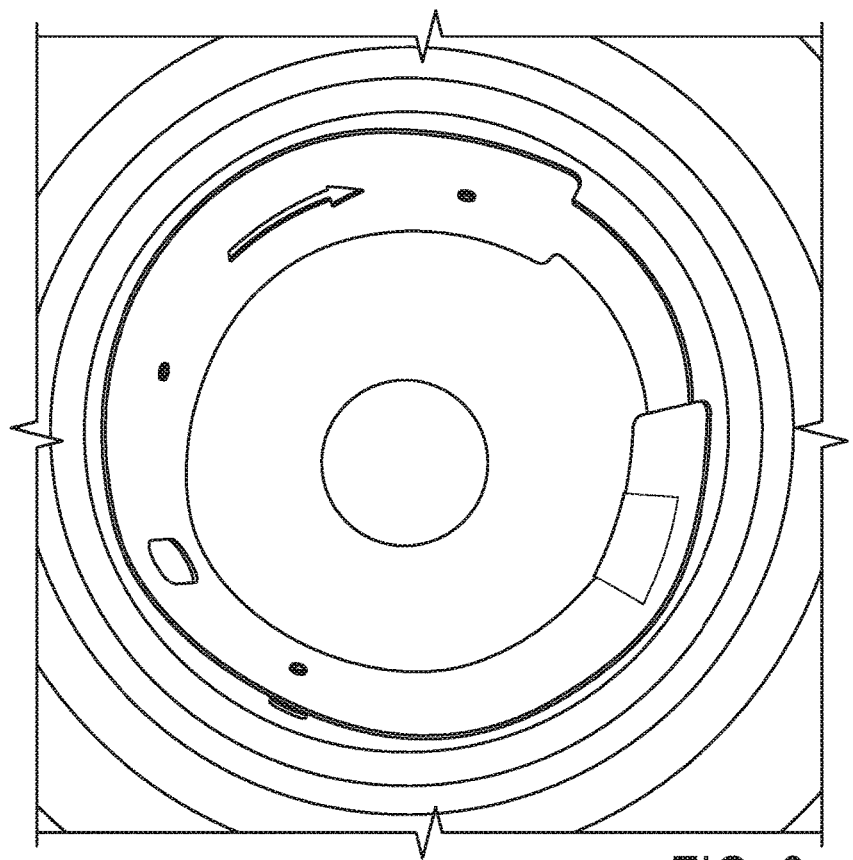
FIG. 6 shows the tubular shaped valve insert of FIG. 5 from a different point of view.

Now referring to FIGS. 5 and 6, the apparatus 100 is shown installed inside a valve box. As shown, apparatus 100 has been adjusted to a suitable diameter such that the diameter of the resulting tubular shape is slightly less than the diameter of the valve box, and the apparatus 100 may be secured in position utilizing a number of securing mechanisms. For example, if the valve box is metallic, magnets may be used as the securing mechanism. Alternatively, if the valve boxes are not metallic, adhesive may be used to install the apparatus in position. Furthermore, as discussed earlier, one or more notches, flaps or patches 108A, 108B may be used to level the apparatus 100 on a ledge or shoulder when inserted. A portion of the apparatus (e.g. a number of tab cut-outs 109A-109C spaced around the apparatus 100) may be bent (e.g. outwardly) to engage a shoulder or rim on which the apparatus 100 rests, although some other means of securing (e.g. adhesive) is still desirable.

Figure 7:
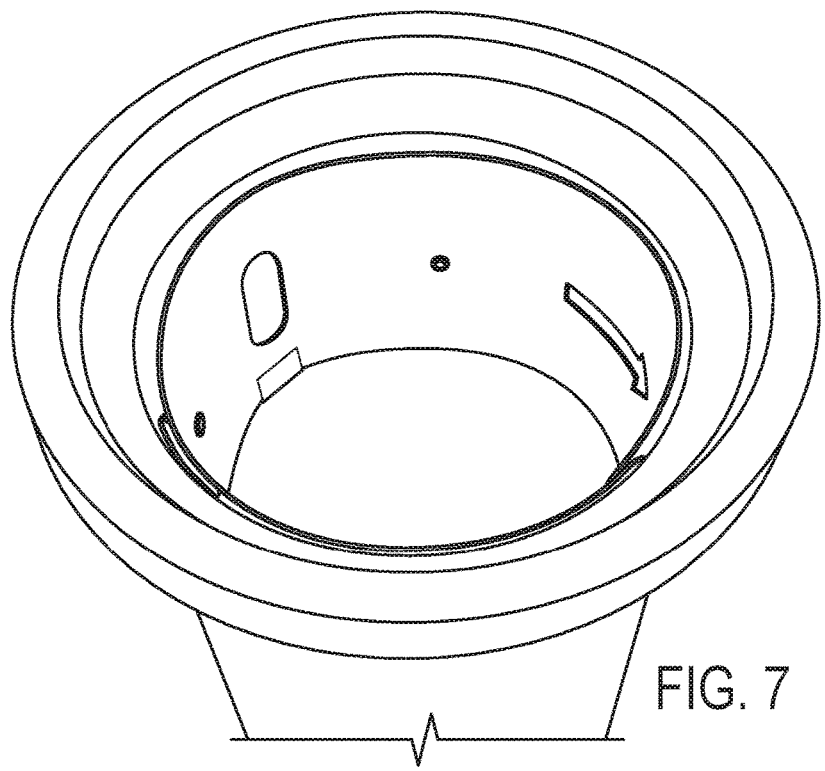
FIG. 7 shows another tubular shaped valve insert of a different color inserted into a second valve.

Now referring to FIG. 7, shown is another illustrative example of an apparatus 100 of a different color installed in a valve box. As shown, the apparatus is again secured by a number of securing mechanisms, for example magnets to secure the apparatus 100 to a metallic valve box.

As shown in FIG. 7, a visual feature may identify a direction, in this case an arrow shaped aperture 110 cut into the band of the apparatus 100 and shown pointing to the right in a clockwise direction. As noted earlier, this arrow shaped aperture 110 may identify the direction of a thread to tighten a lid or cap. By inserting the apparatus in a reverse direction, the arrow shaped aperture 110 will of course point in the opposite counter-clockwise direction.

Advantageously, quick and accurate identification of different types of valves via apparatus 100 using different colors minimizes the chances of human error, and reduces the risk to staff, the public, the environment, infrastructure assets and the owner. There is a corresponding decrease in mitigation costs for emergency failures, and increased operator confidence.

With the selection of an appropriate material, the apparatus 100 can be manufactured to last virtually the life of the valve box and valve it identifies. Thus, apparatus 100 can represent a one time cost for a life time of accurate field identification for virtually all buried municipal infrastructure comprising multi valve distribution and transmission systems.

In another embodiment, rather than being formed from a single color, the apparatus 100 may also be manufactured from two or more colors such that, for example, each valve box insert 100 has a top portion/bottom portion having different colors, or a left portion/right portion having different colors. This may significantly increase the number of different colors and patterns on apparatus 100 which may be used to identify different types of valves with a color scheme.

In a further embodiment, it will be appreciated that additional colors and/or patterns may be used to distinguish an apparatus 100 from another, as long as each of the valve box inserts 100 are readily visually distinguishable from each other.

In yet another embodiment, each apparatus 100 may also be identified by the use of a graphic symbol, or text in addition to the visual identification of color(s) and/or pattern (s). As well, a different number or pattern of cut-outs or orifices may also be used to identify different types of valves.

In still another embodiment, each apparatus 100 may be built to be adjustable to fit different sizes of valves, and to accommodate different types of valve openings, components and features.

In another embodiment, apparatus 100 may further include other identification means, such as a barcode or QR code to further identify the specific valve with a portable barcode or QR code reader, which may be a mobile communication device for example. The bar code/QR code may contain a serial number that correlates the apparatus 100 to a specific valve, as stored in a database accessible via the barcode or QR code.

In another embodiment, an embedded radio frequency ID (RFID) chip may be used to store identification information as well as other data about the valve to make it easier for field personal to verify that the correct valve has been located and obtain other relevant information about the valve.

Thus, in an aspect, there is provided an apparatus for visual identification of valves in a multi valve distribution or transmission system, wherein: the apparatus comprises a flexible, adjustable, color coded band that when assembled forms a generally tubular shape; and the apparatus includes one or more securing mechanisms adapted to secure the apparatus to a valve.

In an embodiment, the apparatus further comprises a tab formed at a first end of the band, and one or more corresponding slots near a second end of the band, the one or more corresponding slots adapted to receive the tab therein.

In another embodiment, the length of the tab inserted into the one or more corresponding slots determines the diameter of the generally tubular shape when the apparatus is assembled.

In another embodiment, the apparatus further comprises a cut into the band near a first end of the band, and one or more corresponding opposing cuts into the band near a second end of the band, the cut near the first end of the band adapted to couple with one of the cuts near the second end of the band to assemble the band to form the generally tubular shape.

In another embodiment, the one or more securing mechanisms comprises magnets placed at intervals along the band, such that when the apparatus is assembled into the generally tubular band, the magnets are distributed around the band to secure the apparatus to magnetically attractive metal valves.

In another embodiment, the magnets are attached to the band using an adhesive.

In another embodiment, the magnets are mechanically attached to the band by a mechanical clasp or bolting means.

In another embodiment, the magnets are embedded within the band.

In another embodiment, the one or more securing mechanisms comprises an adhesive placed at intervals along the band, such that when the apparatus is assembled into the generally tubular band, the adhesives are distributed around the band to secure the apparatus to metal or non-metal valves.

In another embodiment, the apparatus further comprises one or more bendable tab cut-outs spaced around the band, which tab cut-outs may be bent to engage a shoulder or rim of a valve into which the assembled apparatus is inserted.

In another embodiment, the apparatus further comprises one or more visual features indicating a direction.

In another embodiment, the visual feature is an arrow shaped aperture cut into the band.

In another embodiment, the apparatus further comprises an access aperture adapted to provide access to a valve feature that should remain uncovered even after the assembled apparatus is installed within a valve.

In another embodiment, the apparatus further comprises notches, flaps or patches along an edge of the band to help align the assembled apparatus, and any access apertures formed in the apparatus, for installation in a valve.

In another embodiment, the band is formed of a material which maintains its flexibility, breakage and tear resistance, and fire retardancy over a range of operating temperatures.

In another embodiment, the band is formed of a chemically resistant material which is resistant to water, sewage, environmental run-off, salt, oil and grease.

In another embodiment, the apparatus further comprises one or more color bands added to the apparatus, utilizing paint or one or more colored tapes applied using an adhesive.

In another embodiment, the apparatus further comprises graphic symbols, or text in addition to the visual identification of colors.

In another embodiment, the apparatus further comprises identification means, such as a barcode or QR code to further identify the specific valve with a portable barcode or QR reader.

In another embodiment, the apparatus further comprises an embedded radio frequency ID (RFID) chip for further identification.

While the above description provides examples of one or more embodiment and methods, it will be appreciated that other embodiments and methods may be within the scope of the present description as interpreted by one of skill in the art.

The invention claimed is:

1. An apparatus for visual identification of valves in a multi valve distribution or transmission system, wherein:
the apparatus comprises a flexible, adjustable, color coded band that when assembled forms a generally tubular shape;
the apparatus includes a plurality of magnets placed at intervals along the band, such that when the apparatus is assembled, the magnets are distributed around the band to secure the apparatus to magnetically attractive inside opening of a valve; and
the apparatus includes a visual indication of a direction of valve opening or closure.

2. The apparatus of claim 1, wherein the apparatus further comprises a tab formed at a first end of the band, and one or more corresponding slots near a second end of the band, the one or more corresponding slots adapted to receive the tab therein.

3. The apparatus of claim 2, wherein the length of the tab inserted into the one or more corresponding slots determines the diameter of the generally tubular shape when the apparatus is assembled.

4. The apparatus of claim 1, wherein the apparatus further comprises a cut into the band near a first end of the band, and one or more corresponding opposing cuts into the band near a second end of the band, the cut near the first end of the band adapted to couple with one of the cuts near the second end of the band to assemble the band to form the generally tubular shape.

5. The apparatus of claim 1, wherein the magnets are attached to the band using an adhesive.

6. The apparatus of claim 1, wherein the magnets are mechanically attached to the band by a mechanical clasp or bolting means.

7. The apparatus of claim 1, wherein the magnets are embedded within the band.

8. The apparatus of claim 1, wherein the one or more securing mechanisms comprises an adhesive placed at intervals along the band, such that when the apparatus is assembled into the generally tubular band, the adhesives are distributed around the band to secure the apparatus to metal or non-metal valves.

9. The apparatus of claim 1, further comprising one or more bendable tab cut-outs spaced around the band, which tab cut-outs may be bent to engage a shoulder or rim of a valve into which the assembled apparatus is inserted.

10. The apparatus of claim 1, wherein the visual indication is an arrow shaped aperture cut into the band.

11. The apparatus of claim 1, further comprising an access aperture adapted to provide access to a valve feature that should remain uncovered even after the assembled apparatus is installed within a valve.

12. The apparatus of claim 1, further comprising notches, flaps or patches along an edge of the band to help align the assembled apparatus, and any access apertures formed in the apparatus, for installation in a valve.

13. The apparatus of claim 1, wherein the band is formed of a material which maintains its flexibility, breakage and tear resistance, and fire retardancy over a range of operating temperatures.

14. The apparatus of claim 1, wherein the band is formed of a chemically resistant material which is resistant to water, sewage, environmental run-off, salt, oil and grease.

15. The apparatus of claim 1, further comprising one or more color bands added to the apparatus, utilizing paint or one or more colored tapes applied using an adhesive.

16. The apparatus of claim 1, further comprising graphic symbols, or text in addition to the visual identification of colors.

17. The apparatus of claim 1, further comprising identification means, such as a barcode or QR code to further identify the specific valve with a portable barcode or QR reader.

18. The apparatus of claim 1, further comprising an embedded radio frequency ID (RFID) chip for further identification.

* * * * *